US010498688B2

(12) United States Patent
Bostick et al.

(10) Patent No.: US 10,498,688 B2
(45) Date of Patent: Dec. 3, 2019

(54) PRIORITIZING NOTIFICATIONS ON A MOBILE COMMUNICATIONS DEVICE (71) Applicant: International Business Machines Corporation, Armonk, NY (US)

(72) Inventors: James E. Bostick, Cedar Park, TX (US); John M. Ganci, Jr., Cary, NC (US); Martin G. Keen, Cary, NC (US); Sarbajit K. Rakshit, Kolkata (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/962,158

(22) Filed: Apr. 25, 2018

(65) Prior Publication Data

US 2019/0334849 A1  Oct. 31, 2019

(51) Int. Cl.
*H04W 4/00* (2018.01)
*H04L 12/58* (2006.01)
*G06F 3/0481* (2013.01)
*H04L 29/08* (2006.01)
*H04L 12/18* (2006.01)
*G06F 17/27* (2006.01)
(Continued)

(52) U.S. Cl.
CPC .......... *H04L 51/26* (2013.01); *G06F 3/04817* (2013.01); *G06F 17/274* (2013.01); *H04L 12/1859* (2013.01); *H04L 12/1895* (2013.01); *H04L 51/32* (2013.01); *H04L 67/26* (2013.01); *H04W 4/14* (2013.01); *H04W 68/00* (2013.01)

(58) Field of Classification Search
CPC . H04L 51/26; H04L 12/1859; H04L 12/1895; H04L 51/32; H04L 67/26; H04L 5/26; G06F 3/04817; G06F 17/274; G06F 17/28; G06F 17/275; H04W 4/14; H04W 68/00; G06N 99/005
See application file for complete search history.

(56) References Cited

U.S. PATENT DOCUMENTS 8,893,033 B2   11/2014   Donahue et al.
9,438,719 B2    9/2016   Mit et al.
9,460,473 B2   10/2016   DeLuca et al.
(Continued)

FOREIGN PATENT DOCUMENTS

WO    WO2017065365 A1    4/2017

*Primary Examiner* — Barry W Taylor
(74) *Attorney, Agent, or Firm* — Garlick & Markison; Timothy W. Markison; Kelly H. Hale (57) ABSTRACT A method for providing priority notification analysis on a mobile communications device, includes receiving a notification associated with a software application accessible by the mobile communications device and continues with the mobile device transmitting the notification to one or more computing devices that includes one or more modules configured to classify natural language. The method continues with the mobile communications device receiving a priority score associated with the notification that is generated by the one or more computing devices that includes one or more modules configured to classify natural language and in response to determining that the priority score compares favorably to a threshold priority score, rendering the notification for display by the mobile communications device to indicate that the notification meets the threshold priority score.

20 Claims, 5 Drawing Sheets (51) Int. Cl.
*H04W 4/14* (2009.01)
*H04W 68/00* (2009.01)

(56) References Cited

U.S. PATENT DOCUMENTS

| | | | |
|---|---|---|---|
| 2007/0124263 A1* | 5/2007 | Katariya | G06F 17/30663 |
| | | | 706/14 |
| 2011/0294525 A1* | 12/2011 | Jonsson | G06F 17/27 |
| | | | 455/466 |
| 2016/0225370 A1* | 8/2016 | Kannan | G10L 15/22 |
| 2017/0034103 A1* | 2/2017 | Karuppasamy | H04L 51/26 |
| 2017/0263253 A1* | 9/2017 | Thomson | G10L 15/22 |
| 2017/0357716 A1* | 12/2017 | Bellegarda | G06F 16/335 |

* cited by examiner

PRIORITIZING NOTIFICATIONS ON A MOBILE COMMUNICATIONS DEVICE

BACKGROUND

This invention relates to mobile communications devices, and more specifically, to push notifications for software applications used on mobile communications devices.

Mobile computing devices (mobile devices), such as cellular phones, smart phones, mobile phones, Wi-Fi phones, laptop computers, tablet computers, netbooks, hand-held computers, personal organizers, e-reading devices, gaming devices and the like, provide near instantaneous data exchange between each other and with processing resources and data centers. Notifications and/or in-app messaging related to software applications (apps) available on mobile devices can provide useful information to users of the mobile devices.

SUMMARY

Embodiments of the present invention disclose a computer-implemented method, a system, and a computer program product for providing priority notification analysis on a mobile communications device. A notification associated with a software application accessible by a mobile communications device is received at the device and transmitted to one or more computing devices that includes one or more modules configured to provide cognitive analysis. The mobile communications device then receives a priority score associated with the notification that is generated by the one or more computing devices and in response to determining that the priority score compares favorably to a threshold priority score, renders the notification for display by the mobile communications device so as to indicate that the notification meets the threshold priority score.

DETAILED DESCRIPTION

Figure 1A:
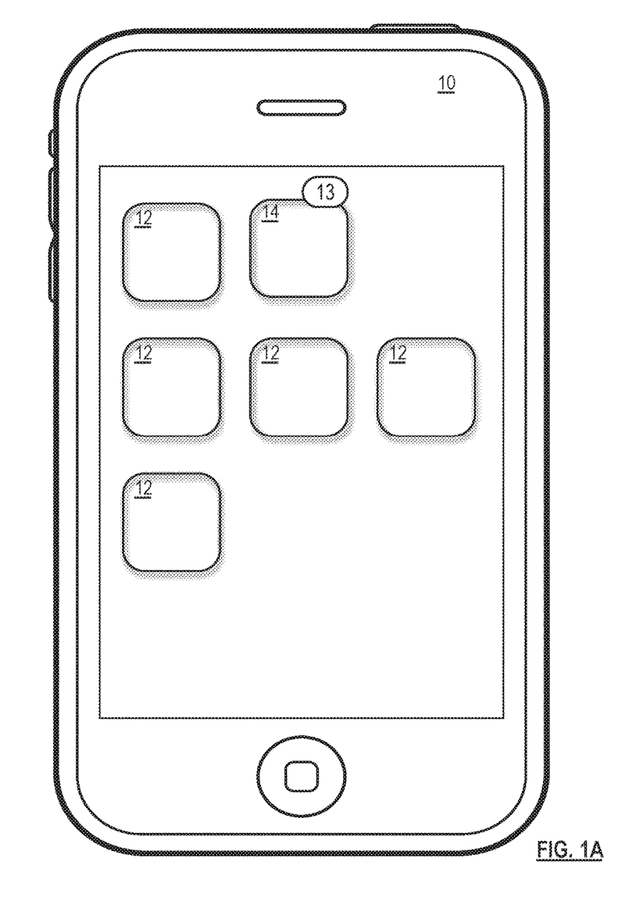
FIG. 1A illustrates a mobile device display, according to an embodiment of the present invention.

According to an embodiment of the present invention, a notification received on a mobile device FIG. 1A illustrates a mobile device display, according to an embodiment of the present invention. The mobile device display includes icons 12 and 14 for software applications (mobile apps) oriented on a display of the mobile device. Mobile apps provide various functions for users of mobile devices, including, but not limited to, general productivity and information retrieval, including email, calendar, contacts, stock market and weather information. Access to mobile apps can be enabled with the use of pictograms (often called "icons"), that are elements of the graphical user interface for mobile devices and can be activated using a pointer, finger or voice commands. Icons are often displayed on mobile devices as stylized symbols that identify the function or provider of the associated mobile application. Additionally, icons can include indicators of notifications, such as push notifications, and in-app (in application) messaging associated with a given mobile app.

Notifications can be messages from mobile apps to the graphical user interface (display) of a mobile device and can be generated by a particular mobile app itself and/or from one or backend servers associated with the mobile app. For example, mobile apps can be initiated automatically by the mobile app according to calendars or triggers executed by the mobile app, or by servers connected by wireless communication links to the mobile device. Notifications can be enabled for third party mobile app providers using mobile notification service platforms, such as the Apple Push Notification Service™. Other mobile notification service platforms include the Microsoft Push Notification Service™ and Google Cloud Messaging™ and others. In some examples mobile notification service platforms are also used for stationary notifications as well.

Notifications associated with a particular mobile app can be graphically represented in a variety of ways. Examples include pop-up balloons and/or windows adjacent to the mobile app icon and may include textual or other information intended for the mobile device user. Referring to FIG. 1A, each of icons 12 and 14 as associated with a mobile app disposed on the mobile device. In the case of icon 14, pop-up balloons are illustrated that indicate not only that a notification has is pending, but also the total number of notifications or messages received by the mobile device that are associated with the mobile app represented by icon 14.

Figure 1B:
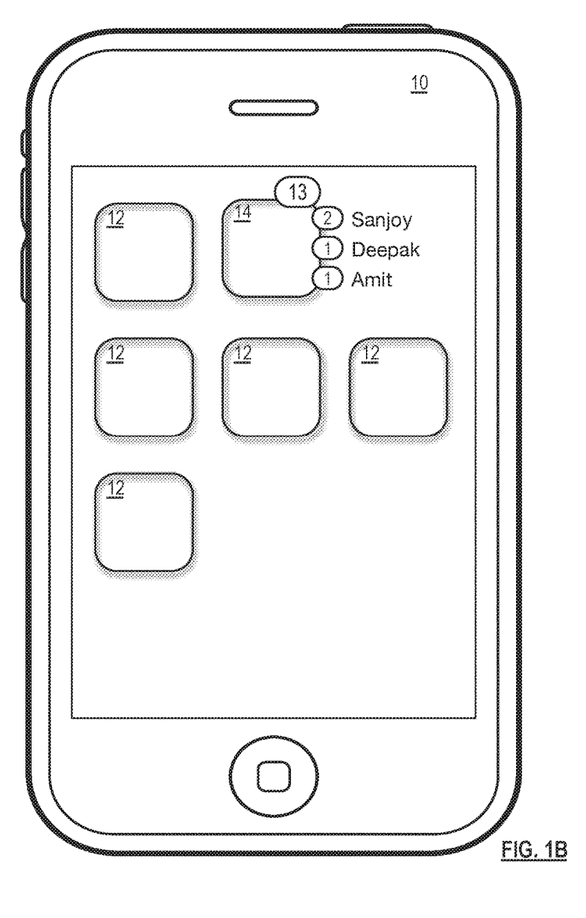
FIG. 1B illustrates another mobile device display, according to an embodiment of the present invention.

While the number of pending notifications is useful information for the user of a mobile device, the number alone provides no differentiation regarding the value or priority of the notifications without actually selecting the associated mobile app and observing the notifications themselves. FIG. 1B illustrates a mobile device display, according to an embodiment of the present invention, wherein additional indicators include the source of certain of the total number of notifications received for that mobile app. For example, 2 notifications identify "Sanjoy" as a source are displayed, and one each from Deepak and Amit are displayed. The order of these additional indicators and the fact that they are displayed outside the total number of received notifications pop-up balloon can indicate that the notifications are of potentially higher priority for the user. Sanjoy is adjacent to a pop-up balloon with "2" inside, indicating that there are two pending notifications from Sanjoy pending. Accordingly, in one embodiment the two notifications associated with Sanjoy have higher priority than the other 11 (13 minus the two for Sanjoy) notifications pending for the mobile app associated with icon 14, and the two notifications pending for Sanjoy are also higher in priority than the single notification for Deepak, which is in turn higher in priority than the single notification for Amit, both of which single notifications are higher in priority than the other 9 notifications represented in original 13 of the larger pop-up. Additionally, once a new notification is received or a pending notification has been resolved pop-up balloons associated with a particular icon can be dynamically updated to reflect the change(s).

Figure 2:
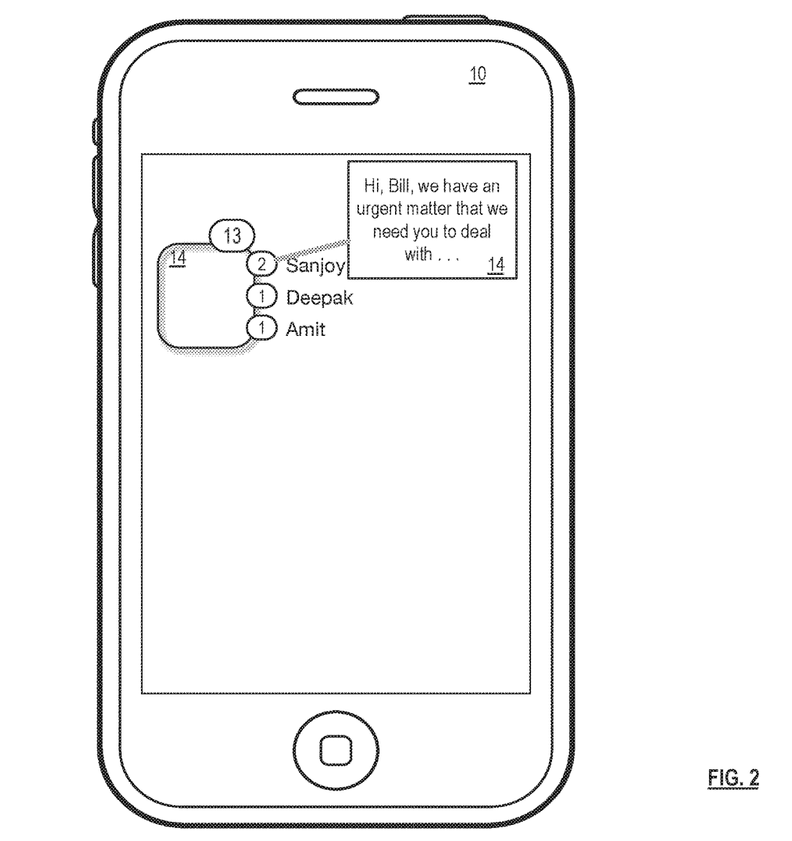
FIG. 2 illustrates another mobile device display, according to an embodiment of the present invention.

The embodiment illustrated in FIG. 1B is, of course, just one embodiment for indicating that messages are pending and for displaying the priority of messages for a user of a mobile device. FIG. 2 illustrates another embodiment of a mobile display. In this embodiment an additional pop-up display window provides at least a portion of a high priority message related to one of the notifications from Sanjoy, either when the name Sanjoy is selected. In one embodiment a user is able to select the high priority message and respond directly, without opening the associated mobile app. In yet another embodiment, the pop-up balloon of FIG. 2 is displayed even when the mobile device display has been in an off state and/or the mobile device is locked. In a variation of these embodiments a user can respond to the high priority message without turning on or otherwise unlocking the mobile device. In each case, the determination to display the pop-up window(s) on the display is in response to the priority of the underlying notification(s).

Figure 3:
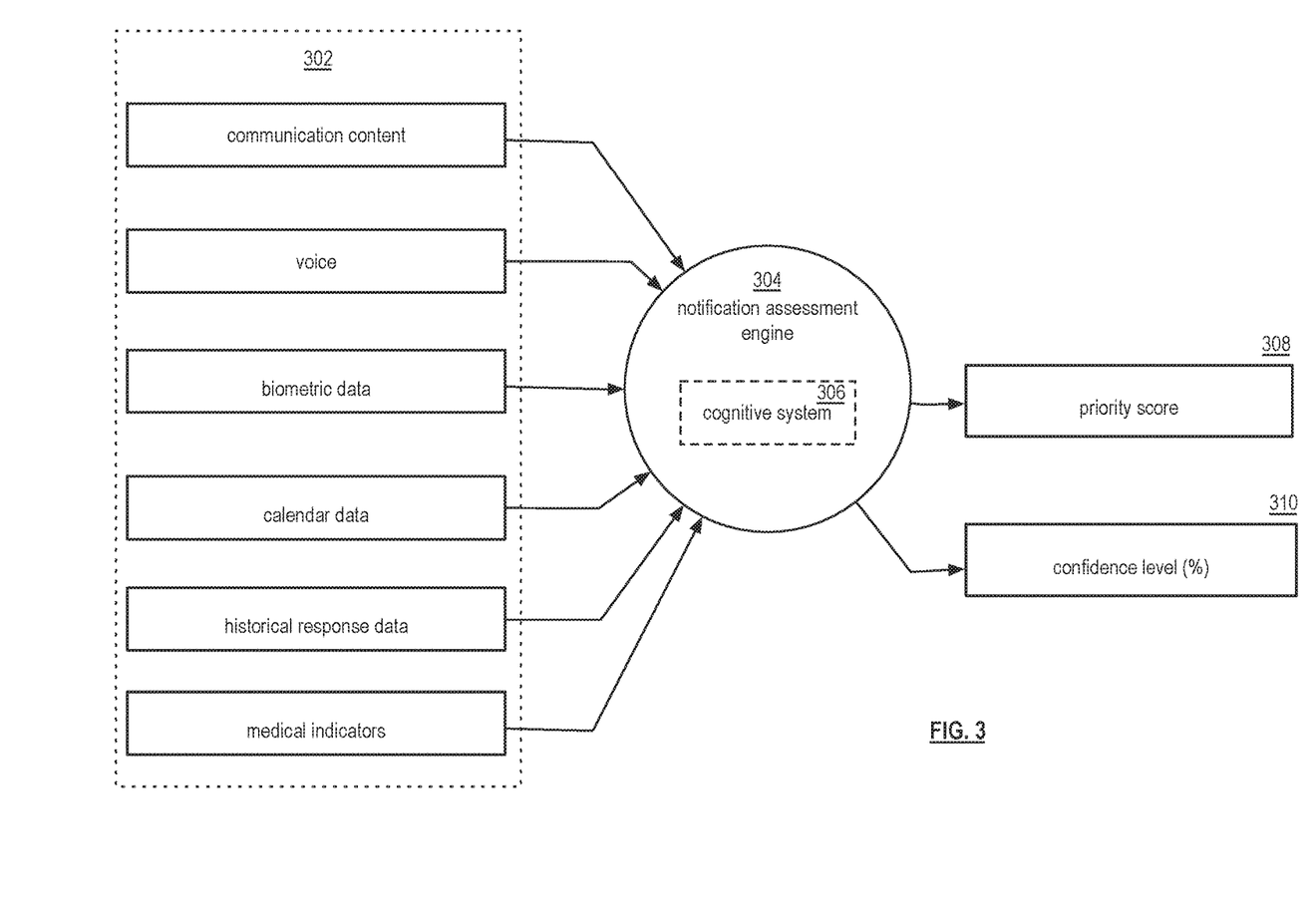
FIG. 3 is a diagram illustrating an embodiment of a notification assessment engine system.

Typical mobile apps provide notifications without regard to the value or "urgency" of the underlying message. However, all notifications are not of equal value to a mobile device user. For example, some notifications relate to casual instant message conversations, while others can relate to more urgent matters and/or matters that require a user's immediate attention. FIG. 3 is a diagram illustrating an embodiment of a notification assessment engine system for determining whether a particular notification is "urgent" or otherwise higher priority. In one example, communication data 302 is input into notification assessment engine 304, which includes cognitive system 306.

Cognitive systems (sometimes called cognitive computing systems), such as cognitive system 306, use natural language processing and machine learning to enable users and computing systems to interact, so as to extend human expertise and cognition across knowledge domains. Using cognitive systems, users can make complex decisions involving large volumes of dynamically changing data. Cognitive systems, as used herein, are a category of artificial intelligence technology that incorporate machine learning, reasoning, natural language processing, speech recognition and vision (object recognition), human-computer interaction, dialog and narrative generation, among other things to improve (and automate) human decision making. Examples of cognitive systems include the IBM Corporation Watson™ question-answering computer system, which is capable of answering questions posed in natural language.

Cognitive system 306 is used by notification assessment engine 304 to analyze communication data 302, which may include the written content of the communication (communication content), voice message(s), biometric data, calendar data, data related to historical responses (such as historical response patterns) and others. The analysis of written text by cognitive system 306 can include various cognitive techniques, including, but not limited to natural language classification and tone analysis. Natural language classification includes the interpretation and classification of a text sample in order to understand the "intent" behind the text. Using natural language classification cognitive system 306 derives the text sample relates to. Tone analysis is used to interpret the style and tone of the sample text; factors include emotion, language and social "tendencies" of the text.

Cognitive system 306 can also be used by notification assessment engine 304 to analyze voice based communication as well, by converting the voice (speech) to text and/or analyzing the tone of the voice to derive emotion, language, and social tendencies based on the voice itself. Biometric data of a notification source, such as heart rate, skin temperature and skin moisture can be used by notification assessment engine 304 derive useful emotional state of the source. In one embodiment a mobile app provider enables the collection of biometric data from a notification source, which data is then provided to the notification recipient. For example, a mobile app provider uses a shared protocol to provide communication data 302 for use in one or more notifications. In another example a mobile app provider maintains a proprietary signaling mechanism to share communication data 302 between users of the mobile app.

Communication data 302 can include calendars, invites for scheduled meeting or events and any other data that can be used to establish priority as to day and/or time of day. Notification assessment engine 304 can then use the calendar data to evaluate time sensitivity of a particular notification. Historical response patterns can also be included in communication data 302; such patterns are repositories of user responses to previous communications and/or other stimuli. For example, communications from an employer or manager might routinely be responded to with immediacy, thereby providing an indication of high priority even when other communication data indicates lower priority.

Many other sources of useful prioritization data may be included in communication data 302; for example, a mobile app may provider certain medical data from a source that may then be provided as a notification to user. Notification assessment engine 304 can evaluate medical data not only as to type, but also as it relates to the communication content of a particular message. For example, a message requesting help from a medically challenged source could be accompanied with medical data included with the accompanying notification.

In one embodiment, output of a notification assessment engine 304 includes a priority score 308 and a confidence level 310. The priority score 308 can be supplied in any practical range providing sufficient granularity to meet the requirements of a user. Confidence level 310 would normally be provided as a confidence percentage based on a 0-100% scale but could use any practical measurement of scale.

Figure 4:
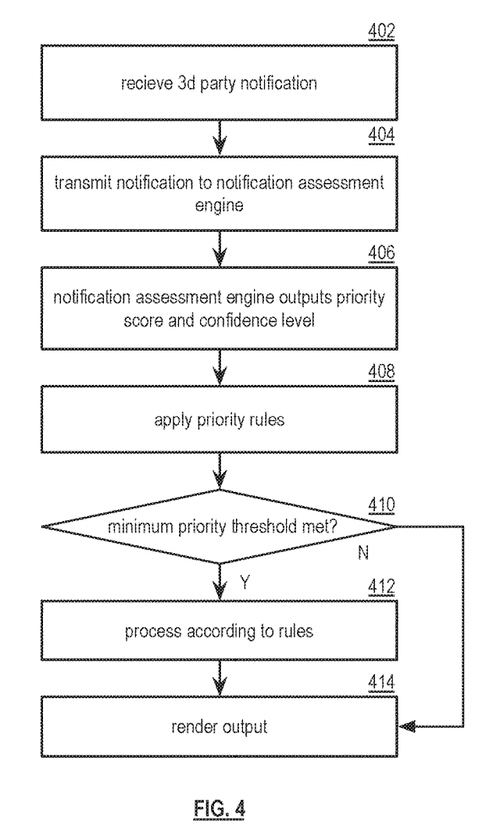
FIG. 4 is a diagram illustrating an embodiment of a method for execution by one or more computing devices according to various embodiments of the present invention.

FIG. 4 is a diagram illustrating an embodiment of a method for execution by one or more computing devices according to various embodiments of the present invention. In step 402 a mobile device receives a notification from a $3^{rd}$ party server. Step 402 can also be a notification from a mobile app operational on the mobile device or from a user's own input. In step 404 the notification is transmitted by the mobile device to a notification assessment engine 304 from FIG. 3, located remote from the mobile device. In another embodiment, notification assessment engine 304 functions can be executed on distributed computing devices and in yet another embodiment one or more notification assessment engine 304 functions can be executed on the mobile device itself.

The method continues at step 406, when the notification assessment engine 304 outputs a priority score 308 and confidence level 310 from FIG. 3. At step 408, one or more processors of the mobile device apply previously determined rules to determine in step 410 whether the priority score and confidence level meet a minimum "threshold" priority, and when the priority threshold meets the minimum threshold the one or more processors of the mobile device render output for the user interface according to the applied rules in steps 412 and 414. When the priority score and confidence level do not meet a minimum "threshold" priority the notification is processed as a low priority notification without applying the rules of step 412.

In one based on FIG. 4, a text message is received from an employer or the employer's surrogate and based on a high historical response notification assessment engine 304 assigns a high priority score (ex:85) and a high confidence level (ex: 90%) to the notification for the text message. In another example a voice mail is received (ex: "please call immediately to resolve this issue"), converted to text and analyzed by notification assessment engine 304 using cognitive system 306 as a natural language classifier and the tone of the voicemail is analyzed to determine that the message is urgent and the emotion is anger and/or distress (high priority score [ex:90] and a high confidence level [ex: 95%]). In yet another example a text message is received and analyzed using then natural language classifier to determine that the priority score is low (ex:20) and the confidence level is high (ex: 87%), thus the notification would not meet the minimum priority threshold and thus would not be treated as a priority notification.

Figure 5:
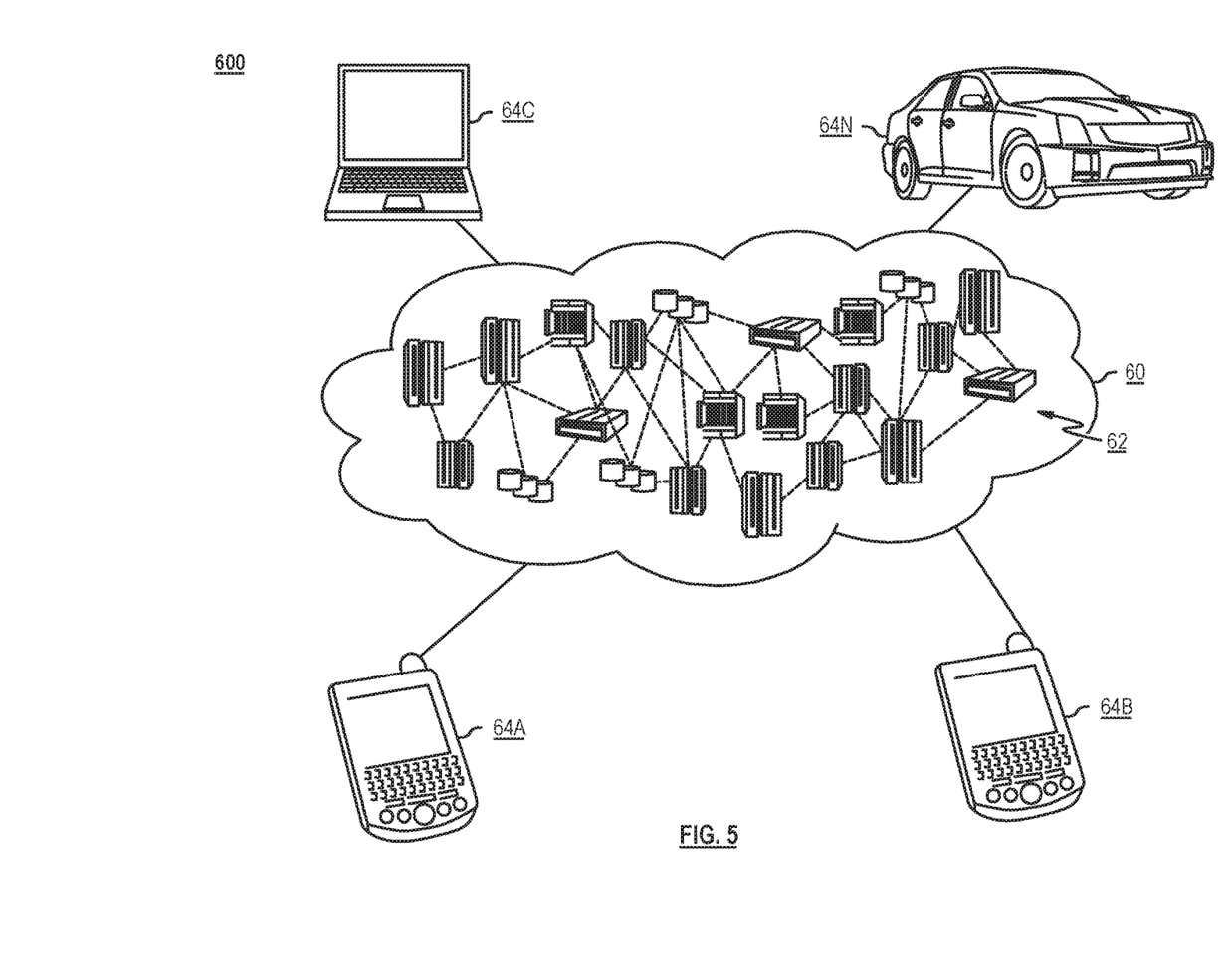
FIG. 5 depicts a cloud computing environment according to various embodiments of the present invention.

FIG. 5 depicts a cloud computing environment 600 according to various embodiments of the present invention. FIG. 5 presents an illustrative cloud computing environment 60. As shown, cloud computing environment 60 includes one or more cloud computing nodes 62 with which local computing devices used by cloud consumers, such as, for example, personal digital assistant (PDA) or cellular telephone 64A, cellular telephone 64B, laptop computer 64C, and/or automobile computer system 64N may communicate. Nodes 62 may communicate with one another. They may be grouped (not shown) physically or virtually, in one or more networks, such as Private, Community, Public, or Hybrid clouds as described hereinabove, or a combination thereof. This allows cloud computing environment 60 to offer infrastructure, platforms and/or software as services for which a cloud consumer does not need to maintain resources on a local computing device. It is understood that the types of computing devices 64A-N shown in FIG. 5 are intended to be illustrative only and that computing nodes 62 and cloud computing environment 60 can communicate with any type of computerized device over any type of network and/or network addressable connection (e.g., using a web browser).

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, cognitive computing platforms, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc.

that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

The present invention may be a system, a method, and/or a computer program product at any possible technical detail level of integration. The computer program product may include a computer readable storage medium (or media) having computer readable program instructions thereon for causing a processor to carry out aspects of the present invention.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid-state memory, a hard drive memory, cloud memory, thumb drive, server memory, computing device memory, and/or other physical medium for storing digital information.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method for execution by a mobile communications device, the method comprising:
    receiving, via an interface of the mobile communications device, a notification, wherein the notification is associated with a software application of a plurality of software applications accessible by the mobile communications device;
    intercepting the notification, by the mobile communications device, before transferring the notification to the software application;
    transmitting, via the interface of the mobile communications device, the notification to one or more computing devices, wherein the one or more computing devices includes one or more modules configured to classify natural language;
    receiving, via the interface and in response to the notification, a priority score that is generated by the one or more modules of the one or more computing devices that is configured to classify natural language;
    determining whether the priority score compares favorably to a threshold priority score; and
    based on a determination that the priority score compares favorably to the threshold priority score:
        transferring the priority score and the notification to the software application; and
        rendering the notification for display with an icon associated with the software application by the mobile communications device, wherein the rendering the notification for display includes providing one or more display elements sufficient to indicate that the notification that corresponds to the priority score meets the threshold priority score.

2. The method of claim 1, wherein the software application is a messaging application, and further wherein the messaging application enables messaging with one or more another mobile communications device.

3. The method of claim 1, wherein the mobile communications device is one of a cellular phone, smart phone, mobile phone, Wi-Fi phone, laptop computer, tablet computer, netbook, handheld computer, personal organizer, e-reading device and a gaming device.

4. The method of claim 1, wherein the notification is associated with at least one of a text message, an email, a mobile alert message, an SMS text message, a push notification and an in-app message.

5. The method of claim 1, wherein the one or more modules configured to classify natural language are modified to analyze written content associated with the notification to determine what the written content pertains to.

6. The method of claim 1, wherein the one or more modules configured to classify natural language are further modified to determine at least one of emotional content, language content, and social tendencies associated with written content associated with the notification.

7. The method of claim 1, wherein the notification is related to a voice message and the one or more modules configured to classify natural language are modified to determine at least one of emotional content, and social tendencies associated with the voice message.

8. The method of claim 1, wherein the notification includes at least one of biometric data associated with a source of the notification, and calendar data associated with a source of the notification.

9. The method of claim 1, wherein the priority score is at least partially based on previously received notifications from a source of the notification.

10. The method of claim 1, further comprising:
    receiving, via the interface and in response to the notification, a confidence level that is generated by the one or more modules of the one or more computing devices;
    determining whether the confidence level compares favorably to a threshold confidence level; and
    based at least partially on a determination that the confidence level compares favorably to the threshold confidence level:
        rendering the notification for display by the mobile communications device, wherein the rendering the notification for display includes providing one or more display elements sufficient to indicate that the notification that corresponds to the priority score meets both the threshold priority score and the threshold confidence level.

11. A mobile communications device comprising:
    an interface configured to interface and communicate with a communication system;
    memory that stores operational instructions; and
    processing circuitry operably coupled to the interface and to the memory, wherein the processing circuitry is configured to execute the operational instructions to:
        receive a notification, wherein the notification is associated with a software application of a plurality of software applications accessible by the mobile communications device;

intercept the notification before transferring the notification to the software application;
transmit the notification to one or more computing devices, wherein the one or more computing devices includes one or more modules configured to classify natural language;
receive, in response to the notification, a priority score that is generated by the one or more modules of the one or more computing devices that is configured to classify the natural language;
determine whether the priority score compares favorably to a threshold priority score; and
based at least partially on a determination that the priority score compares favorably to the threshold priority score:
transfer the priority score and the notification to the software application;
render the notification for display with an icon associated with the software application by the mobile communications device, wherein the display includes providing one or more display elements sufficient to indicate that the notification that corresponds to the priority score meets the threshold priority score.

12. The mobile communications device of claim 11, wherein the software application is a messaging application, and further wherein the messaging application enables messaging with one or more another mobile communications device.

13. The mobile communications device of claim 11, wherein the mobile communications device is one of a cellular phone, smart phone, mobile phone, Wi-Fi phone, laptop computer, tablet computer, netbook, handheld computer, personal organizer, e-reading device and a gaming device.

14. The mobile communications device of claim 11, wherein the notification is associated with at least one of a text message, an email, a mobile alert message, an SMS text message, a push notification and an in-app message.

15. The mobile communications device of claim 11, wherein the one or more modules configured to classify natural language are further modified to determine at least one of emotional content, and social tendencies associated with written content associated with the notification.

16. The mobile communications device of claim 11, wherein the notification is related to a voice message and the one or more modules configured to classify natural language are modified to determine at least one of emotional content, language content, and social tendencies associated with the voice message.

17. The mobile communications device of claim 11, wherein the notification includes at least one of biometric data associated with a source of the notification, and calendar data associated with a source of the notification.

18. The mobile communications device of claim 11, wherein the priority score is at least partially based on previously received notifications from a source of the notification.

19. The mobile communications device of claim 11, wherein the processing circuitry is further configured to execute the operational instructions to:
receive, via the interface and in response to the notification, a confidence level that is generated by the one or more modules of the one or more computing devices that is configured to classify the natural language, wherein the confidence level is associated with the priority score;
determine whether the confidence level compares favorably to a threshold confidence level; and
based at least partially on a determination that the confidence level compares favorably to the threshold confidence level:
render the notification for display by the mobile communications device, wherein the notification for display includes one or more display elements sufficient to indicate that the notification that corresponds to the priority score meets both the threshold priority score and the threshold confidence level.

20. A method for execution by a communications device, the method comprising:
receiving, via an interface of the communications device, a notification, wherein the notification is associated with a software application accessible by the communications device;
intercepting the notification, by the mobile communications device, before transferring the notification to the software application;
sending, via the interface of the communications device, the notification to one or more computing devices, wherein the one or more computing devices includes one or more modules configured to classify natural language;
receiving, via the interface and in response to the notification, a priority score that is generated by the one or more modules of the one or more computing devices that is configured to classify the natural language;
receiving, via the interface and in response to the notification, a confidence level that is generated by the one or more modules of the one or more computing devices that is configured to classify the natural language;
determining whether the combination of the priority score and the confidence level compare favorably to a threshold combination of priority score and confidence level; and
based on a determination that the combination of the priority score and the confidence level compare favorably to the threshold combination of priority score and confidence level:
transferring the priority score and the notification to the software application; and
rendering the notification for display on a display associated with the communications device, wherein the rendering the notification for display includes providing one or more display elements sufficient to indicate that the notification that corresponds to the priority score meets the threshold priority score.

* * * * *